United States Patent
Zeck et al.

(10) Patent No.: US 7,218,784 B1
(45) Date of Patent: May 15, 2007

(54) METHOD AND APPARATUS FOR CONTROLLING IMAGE QUALITY AND COMPRESSION RATIOS

(75) Inventors: Norman W. Zeck, Webster, NY (US); William E. Nelson, Penfield, NY (US); Remo J. D'Ortenzio, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/562,143

(22) Filed: May 1, 2000

(51) Int. Cl.
*G06K 9/36* (2006.01)

(52) U.S. Cl. ...................... 382/232; 382/166

(58) Field of Classification Search ................ 382/232, 382/233, 236, 239, 167, 237, 252, 275, 166; 348/393.1, 241; 358/3.05, 518; 375/240
See application file for complete search history.

(56) References Cited

U.S. PATENT DOCUMENTS

| | | | | |
|---|---|---|---|---|
| 5,309,526 A * | 5/1994 | Pappas et al. | ............... | 382/232 |
| 5,454,051 A * | 9/1995 | Smith | ......................... | 382/233 |
| 5,535,013 A | 7/1996 | Murata | ....................... | 358/482 |
| 5,682,442 A * | 10/1997 | Johnston et al. | ............ | 382/239 |
| 5,696,842 A | 12/1997 | Shirasawa et al. | .......... | 382/176 |
| 5,742,704 A | 4/1998 | Suzuki et al. | ............... | 382/176 |
| 5,802,203 A | 9/1998 | Black et al. | ................ | 382/173 |
| 5,850,474 A | 12/1998 | Fan et al. | .................... | 382/173 |
| 6,037,982 A * | 3/2000 | Coelho | ........................ | 348/393 |
| 6,097,757 A * | 8/2000 | Boice et al. | ................. | 375/240 |
| 6,198,850 B1 * | 3/2001 | Banton | ........................ | 382/239 |
| 6,347,155 B1 * | 2/2002 | Persiantsev et al. | ......... | 382/236 |
| 6,400,844 B1 * | 6/2002 | Fan et al. | .................... | 382/173 |

FOREIGN PATENT DOCUMENTS

WO    WO 96/32811    10/1996

OTHER PUBLICATIONS

Hei Tao Fung, et al., "Segmentation of Scanned Documents for Efficient Compression" proceedings of the SPIE, SPIE, Bellingham, VA, US, vol. 2727, Mar. 17, 1996, pp. 701-712, XP000827642, ISSN: 0277-786X.

Toshiyuki Gotoh, et al., "A Compression Algorithm for Medical Images and a Display with the Decoding Function", Systems and Computer in Japan, vol. 73-DII, No. 2, Feb. 1990, pp. 85-95, XP000234428, ISSN: 0032-4108.

"Video Codec Test Model, Near-Term, Version 8 (TMN8) Revision 1", ITU-T Telecommunication Standardization Sector of ITU, Geneva, CH, vol. Q.15/16, Sep. 8, 1997, pp. I-III, 1-12, XP001074663.

(Continued)

*Primary Examiner*—Anh Hong Do
(74) *Attorney, Agent, or Firm*—Fay Sharpe LLP (57) ABSTRACT

This invention relates to a method and apparatus for controlling image quality and compression ratios in image segmentation. More particularly, the invention is directed to an image segmenting system and method that analyzes and classifies pixel blocks of an image to determine the manner in which the image block should be compressed, e.g. with a lossy or a lossless technique. This approach, which assumes no apriori knowledge of the any specific region of the image, results in effective use of the various known compression techniques and provides improved overall compression ratios and image quality.

18 Claims, 12 Drawing Sheets

OTHER PUBLICATIONS

Rao K. R., Yip P., "Discrete Cosine Transform: Algorithms, Advantages, and Applications—Section 7.13: Activity Classification in Adaptive Transform Coding", 1990, Academic Press, Inc., San Diego, CA, USA XP002265979, ISBN: 0-12-580203-X, pp. 292-303.

Specialist Group on Coding for Visual Telephony; "Description of Ref. Model 8 (RM8)" CCITT SGXV Working Party XV/1, No. 525, Jun. 1998, pp. 1-4, 8, 9-11, 33-36.

* cited by examiner

FIG. 1A
(COMPRESSION)

*FIG. 1B*
(DECOMPRESSION)

FIG. 2A

| JPEG AGGRESSIVE Q-TABLE | | | | | | | |
|---|---|---|---|---|---|---|---|
| 4 | 4 | 17 | 33 | 57 | 93 | 162 | 255 |
| 4 | 25 | 46 | 76 | 102 | 122 | 171 | 255 |
| 17 | 46 | 68 | 90 | 131 | 200 | 255 | 255 |
| 33 | 76 | 90 | 119 | 165 | 247 | 255 | 255 |
| 57 | 102 | 131 | 165 | 227 | 255 | 255 | 255 |
| 93 | 122 | 200 | 247 | 255 | 255 | 255 | 255 |
| 162 | 171 | 255 | 255 | 255 | 255 | 255 | 255 |
| 255 | 255 | 255 | 255 | 255 | 255 | 255 | 255 |

| JPEG GENTLE Q-TABLE | | | | | | | |
|---|---|---|---|---|---|---|---|
| 4 | 4 | 10 | 11 | 13 | 16 | 21 | 31 |
| 4 | 10 | 11 | 12 | 15 | 19 | 26 | 36 |
| 10 | 11 | 12 | 14 | 18 | 23 | 29 | 40 |
| 11 | 12 | 14 | 17 | 22 | 27 | 34 | 46 |
| 13 | 15 | 18 | 22 | 27 | 32 | 40 | 56 |
| 16 | 19 | 23 | 27 | 32 | 40 | 50 | 70 |
| 21 | 26 | 29 | 34 | 40 | 50 | 64 | 91 |
| 31 | 36 | 40 | 46 | 56 | 70 | 91 | 134 |

FIG. 4A
Busy Zone A

FIG. 4B
Busy Zone B

FIG. 4C
Busy Zone C

FIG. 4D
Busy Zone D

FIG. 5

Busy Zone A Lookup Table

| ADRS | EE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 15 | 1700 | F | F | F | F | 4 | 4 | 4 | 4 | 4 | 4 | 4 | 4 | 4 | 4 | 4 | 4 |
| 14 | 1500 | F | F | F | F | 4 | 4 | 4 | 4 | 4 | 4 | 4 | 4 | 4 | 4 | 4 | F |
| 13 | 1300 | F | F | F | F | 4 | 4 | 4 | 4 | 4 | 4 | 4 | 4 | 4 | 4 | F | F |
| 12 | 1100 | F | F | F | F | 4 | 4 | 4 | 4 | 4 | 4 | 4 | 4 | 4 | F | F | F |
| 11 | 900 | F | F | F | F | 4 | 4 | 4 | 4 | 4 | 4 | 4 | 4 | F | F | F | F |
| 10 | 800 | F | F | F | F | 4 | 4 | 4 | 4 | 4 | 4 | 4 | F | F | F | F | F |
| 9 | 700 | F | F | F | F | 4 | 4 | 4 | 4 | 4 | 4 | F | F | F | F | F | F |
| 8 | 600 | F | F | F | F | 4 | 4 | 4 | 4 | 4 | F | F | F | F | F | F | F |
| 7 | 500 | F | F | F | F | 4 | 4 | 4 | 4 | F | F | F | F | F | F | F | F |
| 6 | 400 | F | F | F | F | 4 | 4 | 4 | F | F | F | F | F | F | F | F | F |
| 5 | 300 | F | F | F | F | 4 | 4 | F | F | F | F | F | F | F | F | F | F |
| 4 | 220 | F | F | F | F | 4 | F | F | F | F | F | F | F | F | F | F | F |
| 3 | 150 | F | F | F | F | F | F | F | F | F | F | F | F | F | F | F | F |
| 2 | 90 | F | F | F | F | F | F | F | F | F | F | F | F | F | F | F | F |
| 1 | 40 | F | F | F | F | F | F | F | F | F | F | F | F | F | F | F | F |
| 0 | X | F | F | F | F | F | F | F | F | F | F | F | F | F | F | F | F |

| | X | 0 | 1 | 2 | 3 | 4 | 5 | 6 | 7 | 8 | 9 | 10 | 12 | 14 | 17 | 20 | 24 | EC |
| | X | 0 | 1 | 2 | 3 | 4 | 5 | 6 | 7 | 8 | 9 | 10 | 11 | 12 | 13 | 14 | 15 | Adrs |

KEY:

| LUT Code | COMPRESSION OPTION |
|---|---|
| 0 | JPEG AGGRESSIVE |
| 1 | JPEG GENTLE |
| 2 | JPEG AGGRESSIVE |
| 3 | JPEG GENTLE |
| 4 | LOSSLESS |
| F | ILLEGAL VALUE |

FIG. 6A

Busy Zone B Lookup Table

| ADRS | EE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 15 | 1700 | F | F | F | F | F | F | F | F | F | F | F | F | F | 3 | 3 | 3 |
| 14 | 1500 | F | F | F | F | F | F | F | F | F | F | F | F | 3 | 3 | 3 | 4 |
| 13 | 1300 | F | F | F | F | F | F | F | F | F | F | F | 3 | 3 | 3 | 4 | 4 |
| 12 | 1100 | F | F | F | F | F | F | F | F | F | F | 3 | 3 | 3 | 4 | 4 | 4 |
| 11 | 900  | F | F | F | F | F | F | F | F | F | 3 | 3 | 3 | 4 | 4 | 4 | 4 |
| 10 | 800  | F | F | F | F | F | F | F | F | 3 | 3 | 3 | 4 | 4 | 4 | 4 | 4 |
| 9  | 700  | F | F | F | F | F | F | F | 3 | 3 | 3 | 4 | 4 | 4 | 4 | 4 | 4 |
| 8  | 600  | F | F | F | F | F | F | 3 | 3 | 3 | 4 | 4 | 4 | 4 | 4 | 4 | 4 |
| 7  | 500  | F | F | F | F | F | 3 | 3 | 3 | 4 | 4 | 4 | 4 | 4 | 4 | 4 | 4 |
| 6  | 400  | F | F | F | F | 3 | 3 | 3 | 4 | 4 | 4 | 4 | 4 | 4 | 4 | 4 | 4 |
| 5  | 300  | F | F | F | 3 | 3 | 3 | 4 | 4 | 4 | 4 | 4 | 4 | 4 | 4 | 4 | 4 |
| 4  | 220  | F | F | 3 | 3 | 3 | 4 | 4 | 4 | 4 | 4 | 4 | 4 | 4 | 4 | 4 | 4 |
| 3  | 150  | F | 3 | 3 | 3 | 4 | 4 | 4 | 4 | 4 | 4 | 4 | 4 | 4 | 4 | 4 | 4 |
| 2  | 90   | F | 3 | 3 | 4 | 4 | 4 | 4 | 4 | 4 | 4 | 4 | F | F | F | F | F |
| 1  | 40   | F | 3 | 4 | 4 | 4 | 4 | 4 | 4 | 4 | 4 | F | F | F | F | F | F |
| 0  | X    | F | F | F | F | F | F | F | F | F | F | F | F | F | F | F | F |

| | X | 0 | 1 | 2 | 3 | 4 | 5 | 6 | 7 | 8 | 9 | 10 | 12 | 14 | 17 | 20 | 24 | EC |
|---|---|---|---|---|---|---|---|---|---|---|---|---|---|---|---|---|---|---|
| | X | 0 | 1 | 2 | 3 | 4 | 5 | 6 | 7 | 8 | 9 | 10 | 11 | 12 | 13 | 14 | 15 | Adrs |

KEY:

| LUT Code | COMPRESSION OPTION |
|---|---|
| 0 | JPEG AGGRESSIVE |
| 1 | JPEG GENTLE |
| 2 | JPEG AGGRESSIVE |
| 3 | JPEG GENTLE |
| 4 | LOSSLESS |
| F | ILLEGAL VALUE |

FIG. 6B

Busy Zone C Lookup Table

| ADRS | EE | 0 | 1 | 2 | 3 | 4 | 5 | 6 | 7 | 8 | 9 | 10 | 12 | 14 | 17 | 20 | 24 | EC Adrs |
|------|------|---|---|---|---|---|---|---|---|---|---|----|----|----|----|----|----|---------|
| 15 | 1700 | F | F | F | F | F | F | F | F | 4 | 4 | 4 | 4 | 4 | 4 | 4 | 3 | 15 |
| 14 | 1500 | F | F | F | F | F | F | F | 4 | 4 | 4 | 4 | 4 | 4 | 4 | 3 | 3 | 14 |
| 13 | 1300 | F | F | F | F | F | F | 4 | 4 | 4 | 4 | 4 | 4 | 4 | 3 | 3 | 2 | 13 |
| 12 | 1100 | F | F | F | F | F | 4 | 4 | 4 | 4 | 4 | 4 | 4 | 3 | 3 | 2 | 2 | 12 |
| 11 | 900 | F | F | F | F | 4 | 4 | 4 | 4 | 4 | 4 | 4 | 3 | 3 | 2 | 2 | 2 | 11 |
| 10 | 800 | F | F | F | 4 | 4 | 4 | 4 | 4 | 4 | 4 | 3 | 3 | 3 | 2 | 2 | F | 10 |
| 9 | 700 | F | F | 4 | 4 | 4 | 4 | 4 | 4 | 4 | 3 | 3 | 3 | 2 | 2 | F | F | 9 |
| 8 | 600 | F | 4 | 4 | 4 | 4 | 4 | 4 | 4 | 3 | 3 | 3 | 2 | 2 | F | F | F | 8 |
| 7 | 500 | 4 | 4 | 4 | 4 | 4 | 4 | 4 | 3 | 3 | 3 | 3 | 2 | F | F | F | F | 7 |
| 6 | 400 | 4 | 4 | 4 | 4 | 4 | 4 | 3 | 3 | 3 | 3 | 2 | F | F | F | F | F | 6 |
| 5 | 300 | 4 | 4 | 4 | 4 | 3 | 3 | 3 | 3 | 2 | 2 | F | F | F | F | F | F | 5 |
| 4 | 220 | 4 | 4 | 3 | 3 | 3 | 3 | 2 | 2 | F | F | F | F | F | F | F | F | 4 |
| 3 | 150 | 3 | 3 | 3 | 2 | 2 | 2 | F | F | F | F | F | F | F | F | F | F | 3 |
| 2 | 90 | 2 | 2 | 2 | 2 | F | F | F | F | F | F | F | F | F | F | F | F | 2 |
| 1 | 40 | F | F | F | F | F | F | F | F | F | F | F | F | F | F | F | F | 1 |
| 0 | X | F | F | F | F | F | F | F | F | F | F | F | F | F | F | F | F | 0 |

KEY:
| LUT Code | COMPRESSION OPTION |
|---|---|
| 0 | JPEG AGGRESSIVE |
| 1 | JPEG GENTLE |
| 2 | JPEG AGGRESSIVE |
| 3 | JPEG GENTLE |
| 4 | LOSSLESS |
| F | ILLEGAL VALUE |

FIG. 6C

Busy Zone D Lookup Table

| ADRS | EE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 15 | 1700 | F | F | F | F | F | F | F | 2 | 2 | 2 | 2 | 2 | 2 | 2 | 2 | 2 |
| 14 | 1500 | F | F | F | F | F | F | F | 2 | 2 | 2 | 2 | 2 | 2 | 2 | 2 | 2 |
| 13 | 1300 | F | F | F | F | F | F | F | 2 | 2 | 2 | 2 | 2 | 2 | 2 | 2 | 2 |
| 12 | 1100 | F | F | F | F | F | F | F | 2 | 2 | 2 | 2 | 2 | 2 | 2 | 2 | 4 |
| 11 | 900  | F | F | F | F | F | F | F | 2 | 2 | 2 | 2 | 2 | 2 | 2 | 4 | 4 |
| 10 | 800  | F | F | F | F | F | F | F | 2 | 2 | 2 | 2 | 2 | 2 | 4 | 4 | 4 |
| 9  | 700  | F | F | F | F | F | F | F | 2 | 2 | 2 | 2 | 2 | 4 | 4 | 4 | 4 |
| 8  | 600  | F | F | F | F | F | F | F | 2 | 2 | 2 | 2 | 4 | 4 | 4 | 4 | 4 |
| 7  | 500  | F | F | F | F | F | F | F | 2 | 2 | 2 | 4 | 4 | 4 | 4 | 4 | 4 |
| 6  | 400  | F | F | F | F | F | F | F | 2 | 2 | 4 | 4 | 4 | 4 | 4 | 4 | 4 |
| 5  | 300  | F | 2 | 2 | 2 | 2 | 2 | 2 | 2 | 4 | 4 | 4 | 4 | 4 | 4 | 4 | 4 |
| 4  | 220  | F | 2 | 2 | 2 | 2 | 2 | 2 | 4 | 4 | 4 | 4 | 4 | 4 | 4 | 4 | 4 |
| 3  | 150  | F | 2 | 2 | 2 | 2 | 2 | 4 | 4 | 4 | 4 | 4 | 4 | 4 | 4 | 4 | 4 |
| 2  | 90   | F | 2 | 2 | 2 | 2 | 4 | 4 | 4 | 4 | 4 | 4 | 4 | 4 | 4 | 4 | 4 |
| 1  | 40   | F | F | 2 | 2 | 4 | 4 | 4 | 4 | 4 | 4 | 4 | 4 | 4 | 4 | 4 | 4 |
| 0  | X    | F | F | F | F | F | F | F | F | F | F | F | F | F | F | F | F |

EC   0  1  2  3  4  5  6  7  8  9  10 12 14 17 20 24
Adrs 0  1  2  3  4  5  6  7  8  9  10 11 12 13 14 15

KEY:
| LUT Code | COMPRESSION OPTION |
|---|---|
| 0 | JPEG AGGRESSIVE |
| 1 | JPEG GENTLE |
| 2 | JPEG AGGRESSIVE |
| 3 | JPEG GENTLE |
| 4 | LOSSLESS |
| F | ILLEGAL VALUE |

METHOD AND APPARATUS FOR CONTROLLING IMAGE QUALITY AND COMPRESSION RATIOS

FIELD OF THE INVENTION

This invention relates to a method and apparatus for controlling image quality and compression ratios relating to image compression using image segmentation. More particularly, the invention is directed to an image segmenting system and method that analyzes and classifies blocks of a continuous tone image to determine the manner in which the image block should be compressed, e.g. with a lossy or a lossless technique. This approach, which assumes no apriori knowledge of the any specific region of the image, results in effective use of the various known compression techniques and provides improved overall compression ratios and image quality.

While the invention is particularly directed to the art of image compression, and will be thus described with specific reference thereto, it will be appreciated that the invention may have usefulness in other fields and applications.

BACKGROUND OF THE INVENTION

By way of background, lossy image compression techniques, such as JPEG, Wavelets and Vector Quantization, typically provide high compression ratios and good image quality for pictorials, whereas lossless techniques, such as JPEG-LS, run-length encoding, and various Lempel-Ziv approaches, typically produce good compression results on images containing line art or graphics. Whenever both pictorials and graphics appear on the same image, the exclusive use of a lossy technique often produces unsatisfactory image quality, whereas the exclusive use of a lossless approach often produces unsatisfactory compression ratios. It is to be appreciated that the aforementioned compression techniques, as well as many others, are well known to those of skill in the art and require no detailed description herein.

In addition, a system is desired that requires no apriori knowledge of the imagery content of a specific region or regions of an image. Furthermore, a system is desired for printing applications, where excellent image quality is required along with compression ratios that are high enough to be compatible with the storage and data bandwidth requirements of the printers being used.

The present invention contemplates a new and improved method and apparatus for controlling image quality and compression ratios that resolve the above-referenced difficulties and others.

SUMMARY OF THE INVENTION

A method and apparatus for controlling image quality and compression ratios using image segmentation techniques are provided. Various compression schemes can thus be selectively implemented on segmented blocks to improve performance.

In one aspect of the invention, an apparatus comprises a block analyzer operative to sequentially analyze each block of an image to determine one or more metrics therefor and a block classifier operative to determine which of a plurality of compression schemes will be selected to compress each of the blocks based on the determined metrics.

In another aspect of the invention, a method comprises inputting the image, sequentially analyzing the blocks of the image to determine at least one metric therefor, determining a manner in which each block will be compressed based on the at least one metric determined and compressing each block based on the determining.

This invention overcomes the disadvantages of a single exclusive compression approach by selectively compressing some pixel blocks (usually specified as 8×8 pixels) of each separation of a color image with a lossy approach and compressing the others losslessly. This approach uses the advantageous features of both types of compression approaches and provides a significant overall improvement in compression ratio and image quality. While fixed blocks that are typically 8×8 pixels are the preferred embodiment of this invention, other size or shaped blocks as well as variable size blocks are also possible.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention implements an image segmenter, which performs two basic functions—analysis and classification. As an example, it first analyzes raw, 8 bit gray level data in each 8×8 pixel block of an image (preferably a continuous tone image) to compute a set of M "block characterization metrics" or properties of the image block. The metric values for each block are then used as inputs to a classifier, whose output uniquely maps the block into one of N lossy compression categories, or to a lossless category. Each of the N lossy categories corresponds to a different level of compression aggressiveness. The most aggressive categories produce highest compression ratios at the expense of poorer image quality, whereas the least aggressive categories produce lower compression ratios with better image quality. The number of different metrics (M) and the number of different levels of lossy aggressiveness (N) may vary, but preferably and in most practical applications, the values of M and N are 4 or less. Typically, all analysis and classification functions are improved, preferably optimized, for image quality and compression performance with due consideration given to making the approaches amenable to practical software and hardware implementations.

Figure 1A:
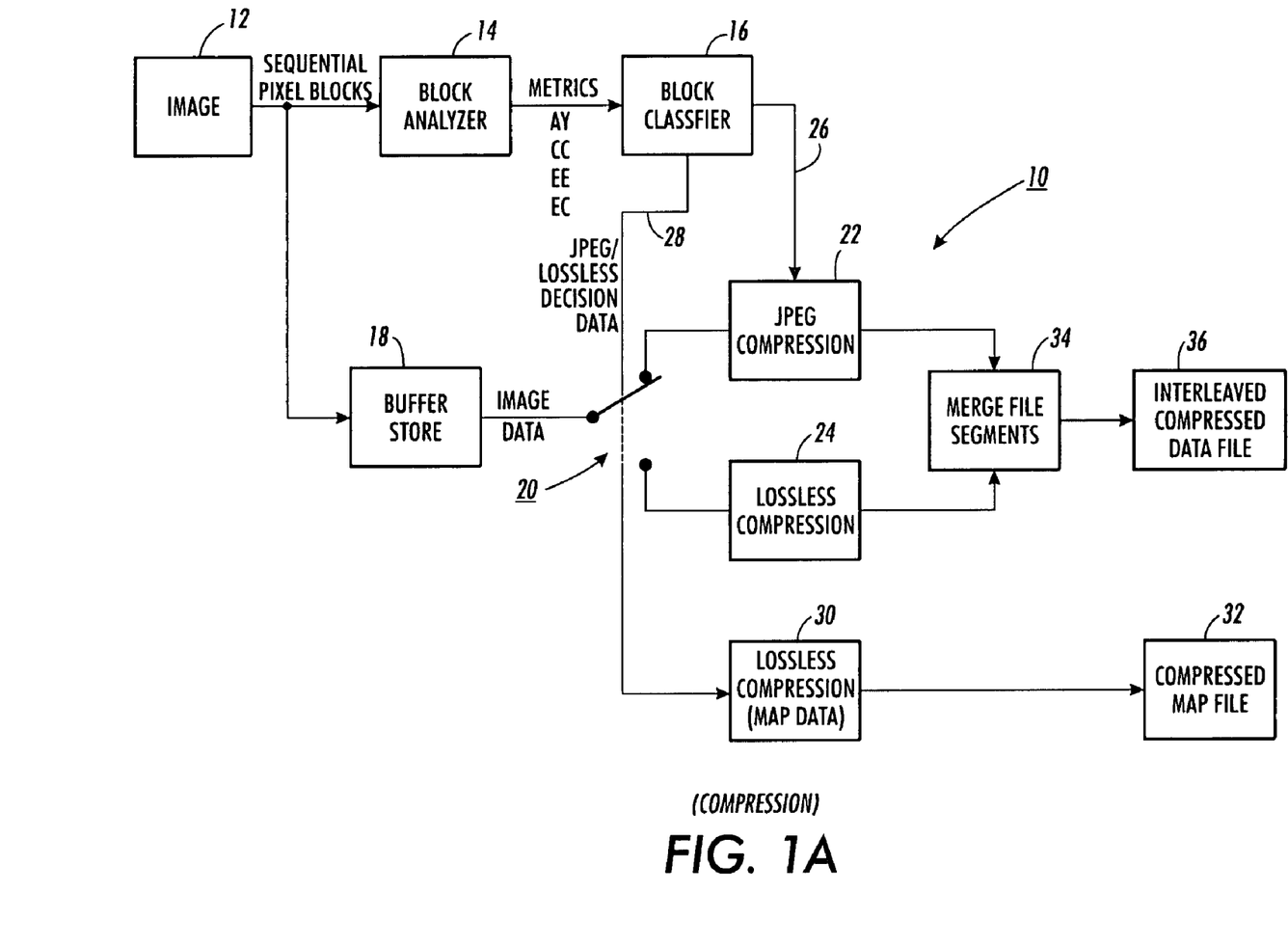
FIGS. 1(a) and 1(b) are block diagrams illustrating a preferred embodiment of the present invention.
Figure 1B:
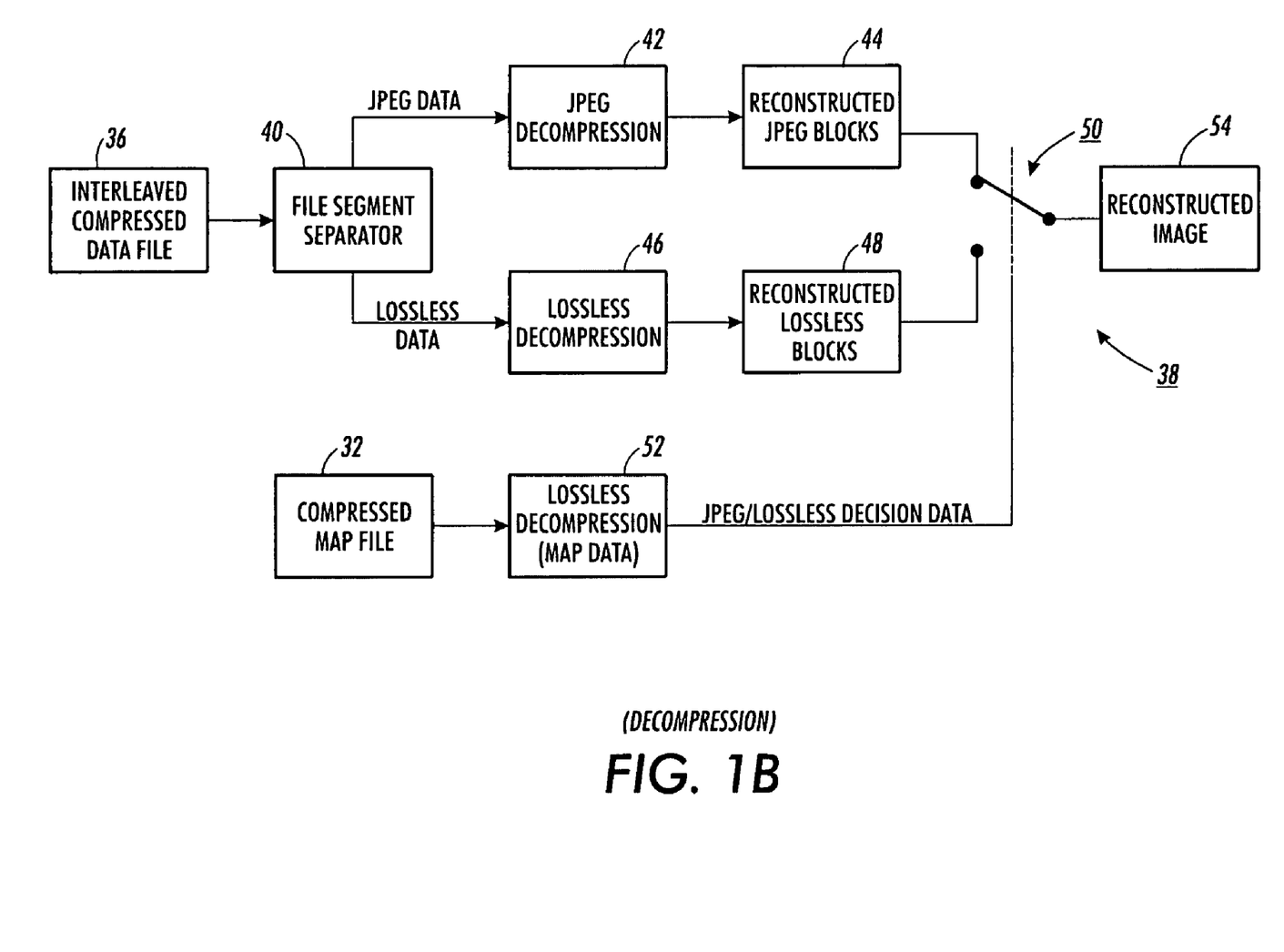

Referring now to the drawings wherein the showings are for purposes of illustrating the preferred embodiments of the invention only and not for purposes of limiting same, FIGS. 1(a) and (b) provide a view of an overall preferred embodiment. As shown in FIG. 1(a), an image compression system 10 includes an image channel 12 for sequentially supplying a block analyzer 14 with pixel blocks (e.g. 8×8 pixel blocks) for analysis and determination of metrics (e.g. AY, CC, EE, EC) or properties. The metrics are then used as input to a block classifier 16.

Also shown in the system is a buffer storage device 18 which stores the image data provided from the image channel 12. A selector gate 20, which is useful for switching the propagation of the image data between a JPEG compression channel(s) 22 and a lossless compression channel 24 in a preferred embodiment, is also provided.

In a preferred embodiment, more than one type of lossy compression scheme may be implemented so a decision path 26 is also provided from the block classifier 16 to the compression channel 22. Data transmitted from the block classifier 16 to the JPEG compression channel indicates the type of lossy compression scheme to be implemented on a particular block, e.g. JPEG Gentle or JPEG Aggressive. In this case, compression channel 22 would contain an implementation of JPEG with a JPEG Gentle table, and an implementation of JPEG with a JPEG Aggressive table as will be hereafter described. It should be appreciated, however, that the lossy compression scheme could take a variety of forms. For example, any type or number of JPEG quantizations could be used. Moreover, any scheme that varies the amount of loss by parameterization may be used. That being the case, different levels of such parameterization could then be used to enable the implementation of different levels of loss.

A data path 28 is further provided to the system to facilitate data transfer from the block classifier 16 to the gate 20 to indicate whether an image block is to be compressed losslessly or with a lossy compression scheme. The data on path 28 is then fed to a map data file 30 which is subsequently compressed to compressed map data file 32. The data on path 28 is important for decompressing the image in that this data indicates which blocks need to be decompressed in a lossy decompression channel and which blocks need to be decompressed in a lossless decompression channel. Preferably, the data on path 28 takes the form of one bit per image block. However, such data may take any suitable form to accommodate the features of the invention.

The compressed image data that results from the compression occurring on the JPEG compression channels 22 and the compressed image data that results from the compression that occurs on the lossless compression channel 24 are merged at module 34. An interleaved compressed data file 36 is then output from module 34. In this embodiment, the data files 32 and 36 are shown separate, but in other embodiments can also be merged to produce a single data file.

Referring now to FIG. 1(b), the interleaved compressed data file 36 and the compressed map file 32 are used to decompress the image at the destination point. More particularly, decompression system 38 comprises a file segment separator, or demultiplexer, 40 which divides JPEG compressed data and lossless compressed data. The JPEG compressed data is provided to a JPEG decompression module or channel 42 to obtain reconstructed JPEG blocks 44. The lossless data is provided to a lossless decompression channel or module 46 and reconstructed lossless blocks 48 are output. The compressed map file 32 is decompressed at module 52. This data is then provided to a selector gate 50 which suitably switches between the reconstructed JPEG blocks and reconstructed lossless blocks to ultimately form a reconstructed image 54.

The principles of this invention will also be appreciated upon a reading of the further detailed description of a preferred embodiment described below. The embodiment described specifies N=2, M=4, a corresponding set of specific block characterization metrics, a criteria for mapping each block to a compression option, and a specific system implementation. Of course, these are merely examples. Many variations of these factors may be accomplished and still fall within the scope of the invention.

In addition, either the Lempel-Ziv 77 (LZ77) or the Lempel-Ziv 78(LZ78) algorithm is preferably used for the lossless compression option and the industry standard baseline JPEG is preferably used for the lossy compression options. Again, from the description which follows, other customized embodiments can be readily formulated to fall within the scope of the invention.

With N lossy options and one lossless option, there are N+1 possible compression options available for each 8×8 pixel block. As stated above, this invention provides a segmentation strategy that maps each pixel block into one of these options, consistent with optimizing system performance over a wide range of image types.

More particularly, the industry standard JPEG algorithm for each of two lossy options (N=2) and a Lempel-Ziv algorithm for the lossless compression option are used, giving a total of N+1=3 compression options. (The two lossy options are referred to as "JPEG Aggressive" (JPEG_AGGR) and "JPEG Gentle" (JPEG_GNTL). This embodiment uses 4 block characterization metrics or properties (M=4) which are described below.

In operation, the analyzer 14 first calculates the 4 metrics from each block's 64 gray level values based on the image provided from the channel 12. (The gray level for each pixel ranges from 0 to 255). Next, the classifier 16 uses the metrics to determine which of the 3 available options should be used to compress that block. The chart below summarizes the metrics' names, the associated variables defined to express their values and the range of possible values for any given block:

| Metric | Variable | Min Value | Max Value |
| --- | --- | --- | --- |
| Color Count | CC | 1 | 64 |
| Activity | AY | 0 | 63 |
| Edge Count | EC | 0 | 56 |
| Edge Energy | EE | 0 | 56 × 255 |

A definition of each exemplary metric will be presented below. However, in order to establish a general understanding of the segmentation process, it will suffice to indicate, that for each block, there corresponds a set of values {CC, AY, EC, EE} which map that block into one of the 3 compression options (e.g. JPEG Aggressive, JPEG Gentle or Lossless). These mappings preferably are based on extensive analysis and empirical evaluations of test images comprising a wide range of imagery types, along with considerations given to practical hardware implementation.

It should be recognized that all color image segmentation, compression and decompression operations described herein are performed on each color separation independently. That is, each separation is independently processed as a gray scale image of 8 bits per pixel. Each separation is referred to as a "sep". Of course, if the original image is monochrome then only a single gray-scale separation ("sep") exists.

As each 8×8 block is sequentially analyzed and classified, the spatial raw data is directed into either the system's JPEG channel(s) 22 (which preferably compresses all blocks classified as JPEG Aggressive or JPEG Gentle) or into the Lossless channel 24 (which compresses assigned blocks losslessly, preferably using a Lempel-Ziv algorithm). Each compressed sep is typically stored in interleaved file segments in data file 36 for subsequent decompression. The file segments are decompressed separately in their corresponding JPEG and lossless decompressors 42 and 46 and are again stored in separate interleaved file segments.

To reassemble the sep, the decompression system 38 must have auxiliary information available to allow successive blocks to be properly retrieved from the interleaved file segments of the data file 36. This auxiliary information is provided via a separate (losslessly compressed) binary control stream provided on path 28, compiled in a data file 30 and compressed (e.g. at 32). The control stream is then decompressed at module 52 to indicate whether each successive block in the original sep was compressed with JPEG or compressed losslessly.

Figure 2A:
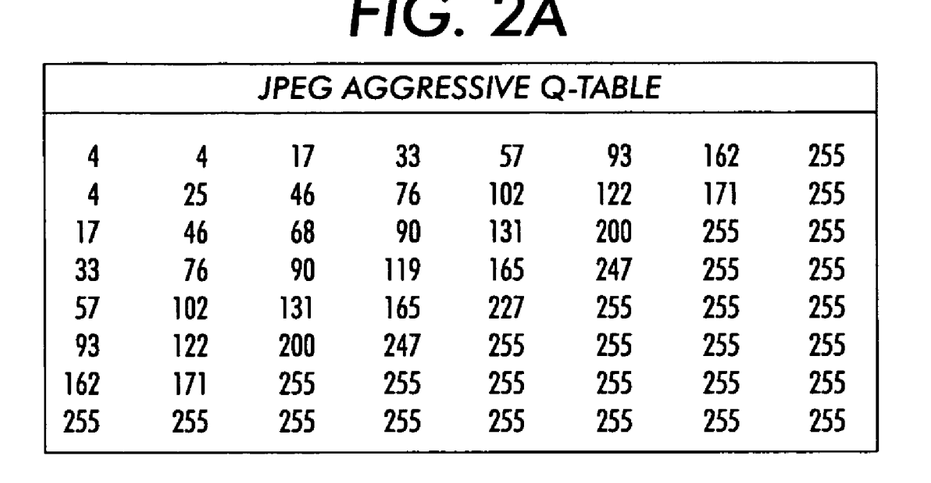
FIGS. 2(a) and 2(b) illustrate Q-tables according to a preferred embodiment of the present invention.
Figure 2B:
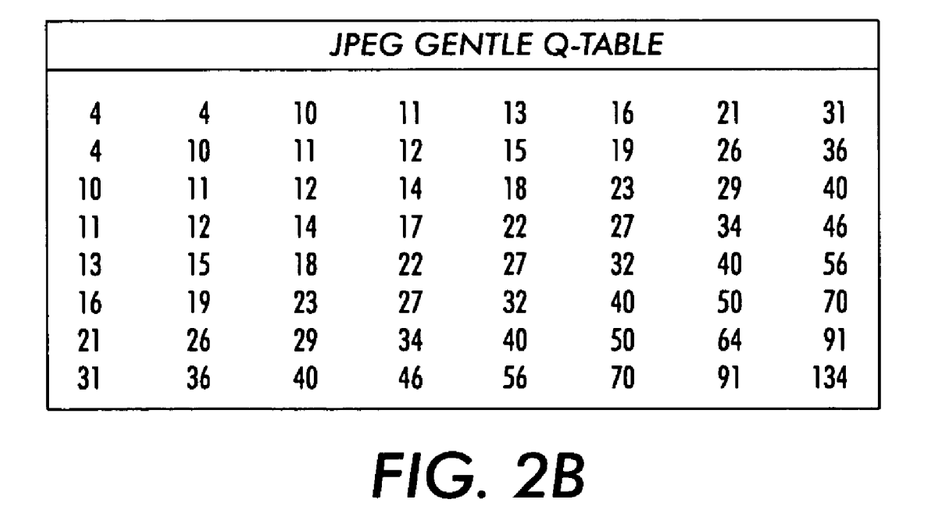

The lossy JPEG portion of this embodiment allows for N=2 possible levels of compression aggressiveness—JPEG Aggressive and JPEG Gentle. In JPEG, this is accomplished by having two different Quantization tables (often referred to as Q tables), each providing a different compression performance. Preferred Q tables are illustrated in FIGS. 2(a) and (b). Because two Q Tables are involved, the JPEG decompressor needs auxiliary information to determine which Q table should be applied to each successive JPEG block being decompressed. This is done by coding each compressed block with standard JPEG marker codes, or by defining a separate special Huffman code to be added to the palette of Huffman codes for the DC term of each block. In either case, the marker code or special Huffman code (and it's associated data fields) would be included only when a Q table change occurred, thus minimizing system overhead. An alternate embodiment is to use the map channel to store the auxiliary information and use two JPEG compression and decompression implementations each with a different Q Table. For this embodiment, the interleaved compressed data file 36 would contain three distinct components, lossless compression data, JPEG Aggressive compressed data, and JPEG Gentle compressed data.

Figure 8:
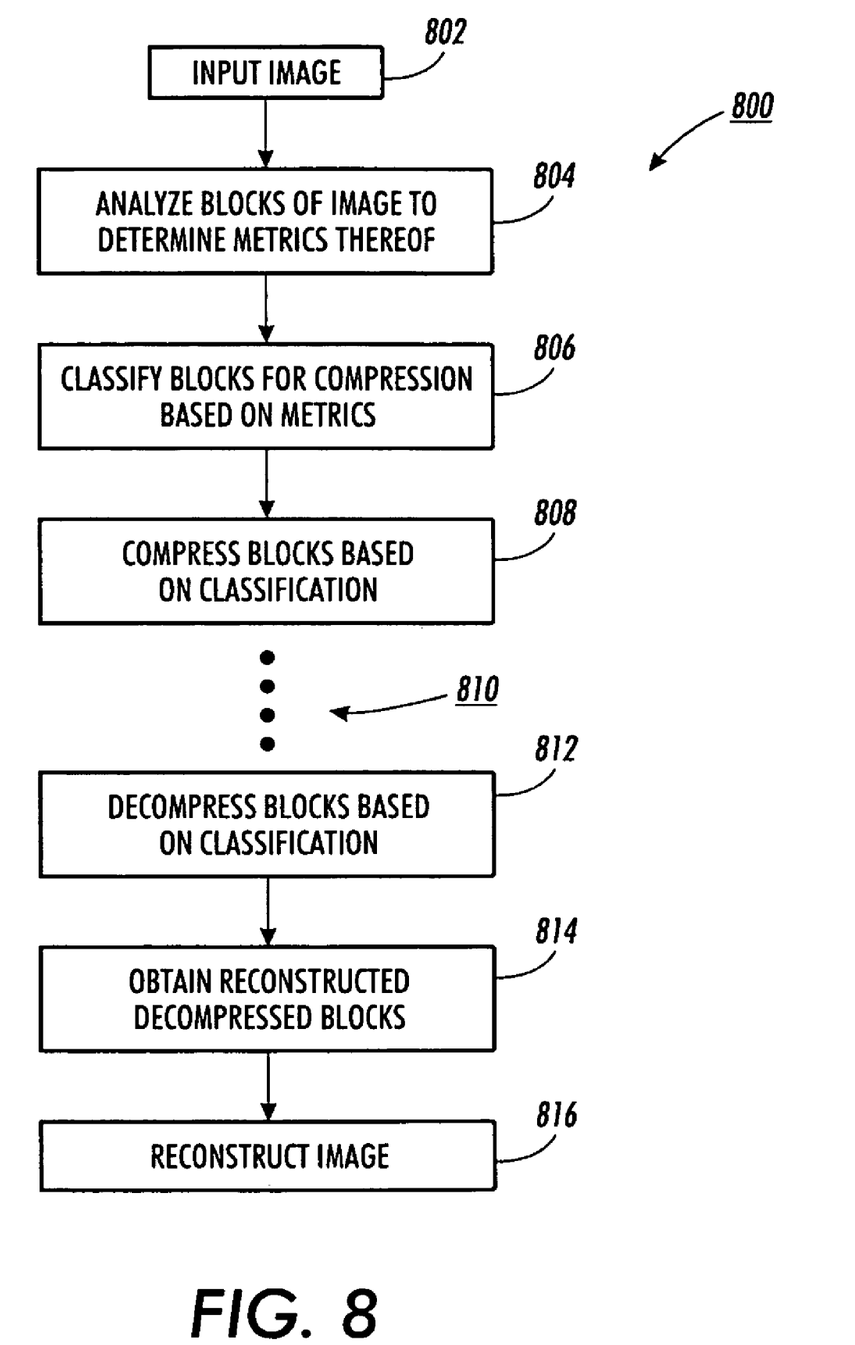

Thus, in view of the system and operation described above, it should be appreciated that the system illustrated in FIGS. 1(a) and (b) has an overall flow. Referring now to FIG. 8, the flow 800 is initiated by the inputting of an image (step 802). The blocks of the image are then sequentially analyzed to determine metrics or properties therefor (step 804). Each block is then classified for compression purposes based on the metrics (step 806). The blocks are then compressed based on the classification (step 808). The compressed blocks are then suitably transmitted to a destination (step 810) where they are decompressed based on the classification (step 812). Decompressed blocks are reconstructed (step 814) and a final image is reconstructed (step 816) to reflect the original input image.

Definition of Metrics

For each 8×8 pixel block, the analyzer 14 computes the metrics CC, AY, EE and EC. These metrics are subsequently used by the classifier 16 to determine which of the N+1=3 compression options to apply to the current block. The preferred metrics are defined below but it should be appreciated that other suitable metrics, or properties, of the image blocks may be utilized.

Let each pixel block be represented by the matrix:

$$P = \begin{matrix} p11 & p12 & p13 & p14 & p15 & p16 & p17 & p18 \\ p21 & p22 & p23 & p24 & p15 & p26 & p27 & p28 \\ p31 & p32 & p33 & p34 & p35 & p36 & p37 & p38 \\ p41 & p42 & p43 & p44 & p45 & p46 & p47 & p48 \\ p51 & p52 & p53 & p54 & p55 & p56 & p57 & p58 \\ p61 & p62 & p63 & p64 & p65 & p66 & p67 & p68 \\ p71 & p72 & p73 & p74 & p75 & p76 & p77 & p78 \\ p81 & p82 & p83 & p84 & p85 & p86 & p87 & p88 \end{matrix}$$

where pij is the pixel gray scale value in the ith row and jth column.

An alternative representation is thus:

P=[pij]; i=1, 2, 3 . . . 8; j=1, 2, 3 . . . 8

Color Count (CC)

Color Count (also called Gray Value Count) represents the number of different gray level values contained in each 8×8 block. The minimum CC is thus 1, and the maximum is 64.

Activity (AY)

For the purpose of computing Activity (AY), let all 64 elements of the square matrix P be rearranged as a row matrix Pr as follows:

Pr=p11 . . . p18 p21 . . . p28 p31 . . . p38 p41 . . . p48 p51 . . . p58 p61 . . . p68 p71 . . . p78 p71 . . . p88

Activity (AY) is defined as the number of gray scale value changes between adjacent elements as the elements are read from left to right. The minimum possible AY is thus 0, and the maximum is 63.

Edge Energy (EE)

Edge Energy is the "greatest of" two calculations—one using adjacent elements of each row of the 8×8 block, the other using adjacent elements of each column. The "Horizontal Edge Energy (HEE)" represents the total of all gray scale magnitude differences between adjacent elements of each row which exceed an adjustable "edge detection" threshold (EDT), typically set at 40. The minimum HEE is thus 0, and the maximum is 255 per edge, times 7 edges per row, times 8 rows, or 255×56 total. The "Vertical Edge Energy" (VEE)" represents the same type of calculation using adjacent elements of each column. Then, EE becomes the "greatest of" HEE and VEE.

Expressed mathematically:

$$HEE = \sum_{i=1}^{8} \sum_{j=1}^{7} \begin{cases} |pi, j - pi, j+1|, & \text{if} |pi, j - pi, j+1| \geq EDT \\ 0, & \text{otherwise} \end{cases}$$

-continued $$VEE = \sum_{i=1}^{8} \sum_{j=1}^{7} \left\{ \begin{array}{ll} |pi, j - pi + 1, j|, & \text{if}|pi, j - pi + 1, j| \geq EDT \\ 0, & \text{otherwise} \end{array} \right\}$$

$$EE = \text{Max}\{HEE, VEE\}$$

Edge Count (EC)

Edge Count (EC) represents the number of edges associated with the Edge Energy (EE) computation described above. Although both Horizontal Edge Count (HEC) and Vertical Edge Count (VEC) are available for every block, the one which becomes the Edge Count (EC) is simply determined by association with the corresponding largest Edge Energy value.

Expressed mathematically:

$$HEC = \sum_{i=1}^{8} \sum_{j=1}^{7} \left\{ \begin{array}{ll} 1, & \text{if}|pi, j - pi, j + 1| \geq EDT \\ 0, & \text{otherwise} \end{array} \right\}$$

$$VEC = \sum_{j=1}^{8} \sum_{i=1}^{7} \left\{ \begin{array}{ll} 1, & \text{if}|pi, j - pi + 1, j| \geq EDT \\ 0, & \text{otherwise} \end{array} \right\}$$

$$EC = \left\{ \begin{array}{ll} HEC, & \text{if } HEE \rangle VEE \\ VEC, & \text{otherwise} \end{array} \right\}$$

Block Classification Considerations

An efficient classification approach, amenable to both software and hardware as those of skill in the art will appreciate, for mapping each {CC, AY, EC, EE} measurement into one of the N+1 available compression options, is based on the analyzing and evaluating the image quality and performance of compression options applied to a wide variety of test images. For this described embodiment, N was chosen to be 2, thus giving a total of 3 different compression options, 2 JPEG and 1 lossless. Using 2 different JPEG Q Tables provides an implementation that is very cost-effective. However, the invention being disclosed places no limits on the value of N that may be used.

The following definitions are useful for explanatory purposes:

1. "Edge Energy Density", referred to below, represents the ratio of EE and EC, or the average Edge Energy per Edge.

2. "Constant Blocks" have only one color: [CC=1]. (Hence, AY=EC=EE=0).

3. "Flat Blocks" are defined by: [CC>1, EE=0]. (Hence, AY>0, EC=0).

In choosing N=2, the JPEG Q Table types of FIGS. 2(a) and (b) are preferably used for improved optimum image quality and compression performance. The "Aggressive" Q Table of FIG. 2(a) is provided for blocks with low to moderate Edge Energy Density and moderate to high Activity and/or Color Count. The "Gentle" Q Table of FIG. 2(b) is provided for blocks with high Edge Energy Density and moderate to high Activity and/or Color Count.

Efficiently mapping individual blocks into the JPEG options or the Lossless option suitably involves tradeoffs between compression ratio and image quality. It should be appreciated that Constant Blocks (CC=1) are an exception. They are compressed losslessly, because lossless compression of Constant Blocks provides both perfect quality and high Compression Ratios.

It is to be further appreciated that blocks containing high Edge Energy Density (as typically obtained the edge of a high contrast object, line or curve) are also often compressed losslessly, because compressing such blocks with JPEG often produces "ringing" effects in the reconstructed image. (The degree of ringing would be a function of the aggressiveness of the Q Table used). Unfortunately, using Lossless Compression for high Edge Energy Density blocks is only practical if AY and CC are small enough to avoid a prohibitively low compression ratio. With larger values of AY and/or CC, the JPEG Gentle option is often chosen instead of Lossless, in order to provide a better compression ratio. The larger AY, CC values and the gentle Q Table would tend to minimize any visible ringing artifacts.

Flat blocks (CC>1, EE=0) having low values of AY and CC often come from "sweeps". For this case, blocking artifacts can be minimized, by choosing the Gentle Q table option. Flat blocks which have higher values of AY and CC (and hence are "busier") are less likely to show blocking artifacts and are thus compressed with the Aggressive Q table.

Values of the Q-tables shown in FIGS. 2(a) and 2(b) are selected (preferably in accord with the definition of Q-tables that will be understood by those skilled in the art upon a reading of the well-known CITT standard T.81) to achieve an acceptable balance between compression ratio and image quality for each of the two classifications with which the Q tables are matched. However, the invention being disclosed places no limits on the Q tables that can be used.

Some of the basic, preferred qualitative principles discussed above for the block mapping assignments are summarized below. Each represents an improved tradeoff between image quality and compression performance, as derived from the analysis and empirical evaluations of many images and image types.

1. Constant blocks (CC=1) are to be compressed losslessly.

2. Flat blocks (CC>1, EE=0) are to be compressed with either the Aggressive or Gentle JPEG Q table. The choice between Aggressive and Gentle will depend on the values AY and CC. The actual metric partitioning strategy is discussed below.

3. For all other blocks (EE>0), the choice of JPEG Gentle, JPEG Aggressive or Lossless, depends on the values of all metrics (CC, AY, EE, EC). The metric partitioning strategy is discussed below.

Figure 3A:
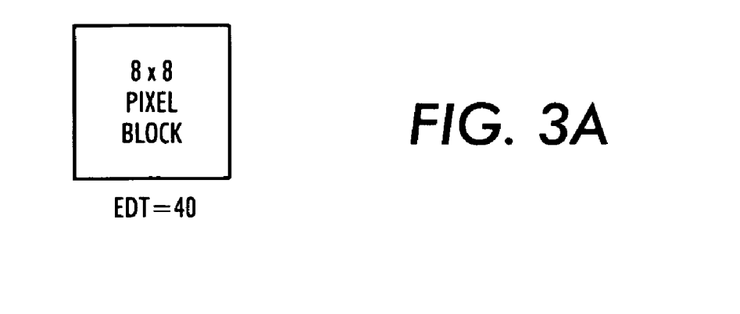
FIGS. 3(a)–(c) are graphical illustrations relating to classification according to a preferred embodiment of the present invention.

The classification of Constant Blocks (CC=1) has already been defined in Item 1. The strategies adopted for classifying the blocks (one of which is representatively shown in FIG. 3(a)) described in Item 2 (CC>1, EE=0) and Item 3 (CC>1, EE>0) will be appreciated in view of the graphical relationships among the 4 metrics, CC, AY, EC, and EE shown in FIGS. 3(a)–(c) and 4(a)–(d).

Figure 3B:
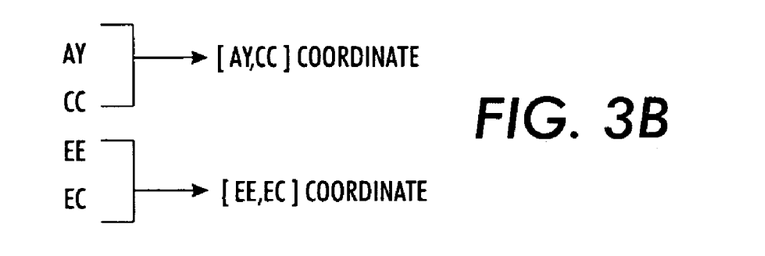
Figure 3C:
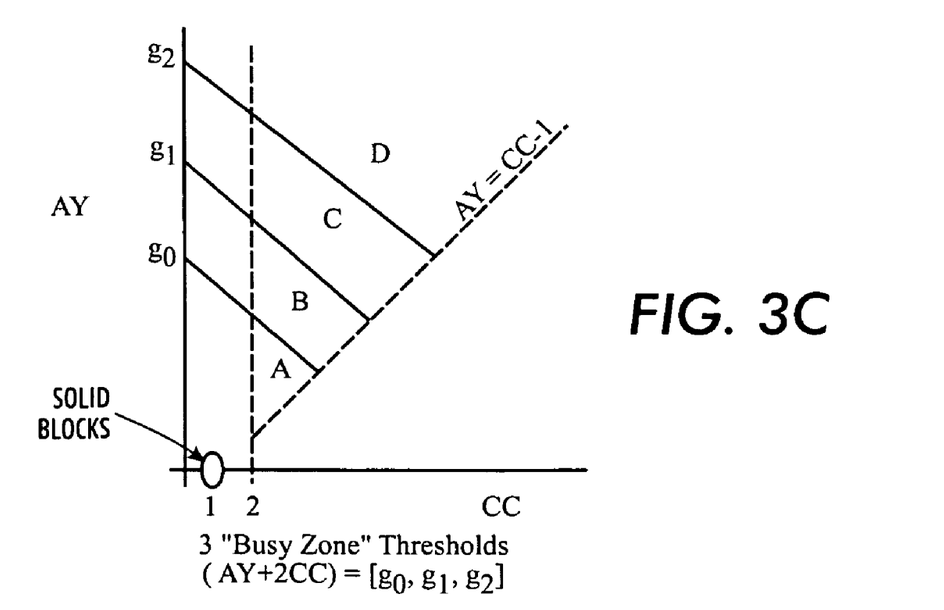

Rather than attempting to represent these variables in a 4-dimensional space, the variables are first grouped into the pairs {CC, AY} and {EC, EE} as shown in FIG. 3(b). These can be readily visualized in two separate two-dimensional {x, y} spaces as shown in FIGS. 3(c) and 4(a)–(d). FIG. 3(c) shows the relationship between AY and CC and FIGS. 4(a)–(d) the relationship between EE and EC. For each block there is an {CC, AY} coordinate that can be plotted in FIG. 3(c) and an {EC, EE} coordinate that can be plotted in the appropriate part of FIGS. 4(a)–(d).

The relationships between AY and CC are shown in FIG. 3(c). The two (dotted) boundary lines plus one isolated point define the gamut of all possible (CC, AY) values. The isolated point at (1,0) represents the Constant Block coordinates. The equation of the lower boundary line is AY=CC−1, because for a given CC, there must correspond an AY of at least CC−1. Another boundary line in FIG. 3(c) is vertical at the abscissa value of CC=2. The defined region extends vertically to a maximum possible AY value of 63.

FIG. 3(c) is also partitioned into zones. Again, there is no theoretical limit on how many zones can be defined in any given embodiment, or how they might be shaped, but for practical hardware implementation reasons that will be appreciated by those skilled in the art, this described embodiment preferably partitions the {CC, AY} space into four zones. Furthermore, as a result of extensive empirical and analytical data, these partitions are defined by three parallel lines with slopes of −2, whose AY intercepts have been "tuned" for optimum Block Classification. The equations are of the form AY+2 CC=g, where g is a different AY intercept value for each of the three lines. This partitioning essentially creates four unique zones in the {CC, AY} space, which tend to classify the "busyness" of a given block. These are shown in FIG. 3(c) as zones A, B, C, and D, where A is the "least busy" zone and D is the "most busy". Hence, the metrics AY and CC have been merged together to form the pseudo "Busyness" metric [AY+2CC]. Three selected values of g ($g_0$, $g_1$, $g_2$) define three [AY+2CC] ("Busyness") thresholds that partition the space into zones A, B, C and D. The Zone identity for each {CC, AY} coordinate is thus readily determined by simply comparing the [AY+2 CC] value to three thresholds. This is readily accomplished in either software or hardware.

Busy zones A, B, C and D shown in FIG. 3(c), are each associated with the EE vs. EC relationships shown in FIGS. 4(a), 4(b), 4(c) and 4(d) respectively. The four figures have identical outer (dotted) boundaries showing the gamut of possible {EC, EE} coordinates that can exist for any given block. The lower boundary line has a slope equal to the Edge Detection Threshold EDT (typically 40), and the upper boundary line has a slope of 255 corresponding to the maximum Edge Energy transition per edge. Since the maximum possible EC is 56, and the maximum Edge Energy per Edge Count is 255, the absolute maximum {EC, EE} coordinate value possible is {56, 56×255}.

As previously stated, FIGS. 4(a), 4(b), 4(c) and 4(d) are directly associated with each corresponding Busy zone of FIG. 3(c). For any given set of metrics {CC, AY, EC, EE}, the Classification procedure followed is to first determine which Busy Zone contains the {CC, AY} coordinate. This vectors the system to the corresponding EE vs. EC diagram, where the defined region which captures the {EC, EE} coordinate determines the compression options.

Figure 4A:
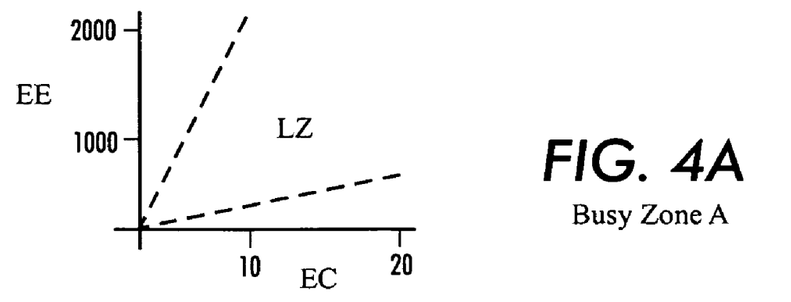
FIGS. 4(a)–4(d) are graphical illustrations relating to classification according to a preferred embodiment of the present invention.
Figure 4B:
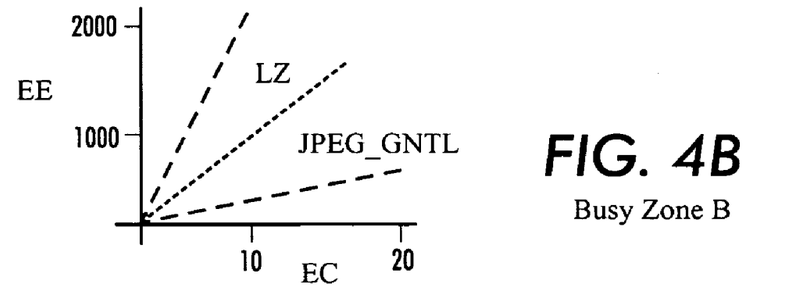
Figure 4C:
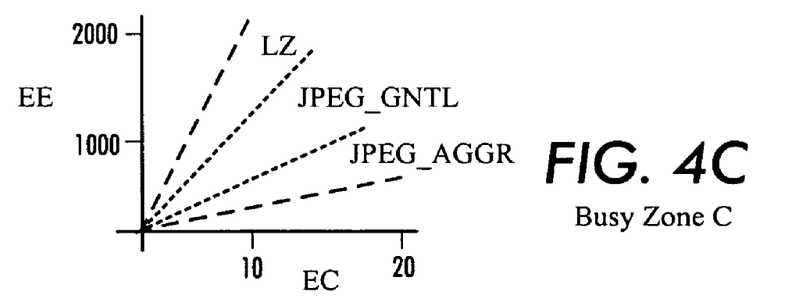
Figure 4D:
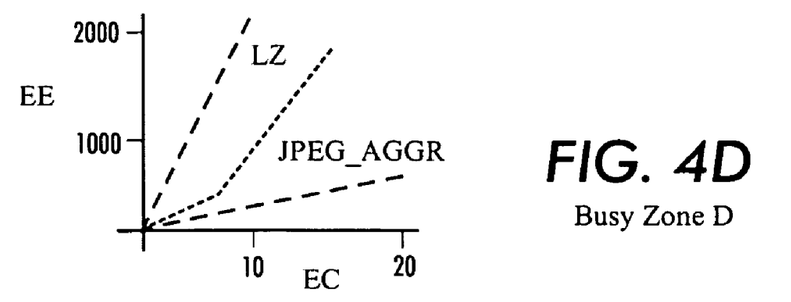

Again, the shapes and sizes of the regions in FIGS. 4(a), 4(b), 4(c), and 4(d) are theoretically arbitrary. However, for practical considerations and for preserving the concept of Edge Energy Density as a block classification tool, the boundaries were chosen to be straight lines of the form EE=m EC+h, where m is the slope and h is the EE intercept. Extensive analysis and testing has provided a set of slopes and intercepts for each of the four diagrams that were improved, or optimized, in conjunction with the corresponding Busy Zones of FIG. 3(c). For example, it was found that both image quality and compression ratio were enhanced by setting a very low Busy Zone A threshold and directing all blocks from Busy Zone A to lossless compression, independent of the values of the {EC, EE} coordinates. This is shown in FIG. 4(a), where, except for the Flat Blocks, all compression is Lossless. For Busy Zone B, it is seen that the {EC, EE} coordinates map into either Lossless or JPEG Gentle. The mappings for Busy Zones C and D are likewise shown in FIGS. 4c and 4d respectively. In each case, the sloped boundary lines represent (approximately) Edge Energy Density boundaries.

Flat Blocks (which map to the origin of each Figure) are handled separately. All Flat blocks in Zone A are compressed with JPEG Gentle, while those in Zones B, C, and D are compressed with JPEG Aggressive.

Figure 5:
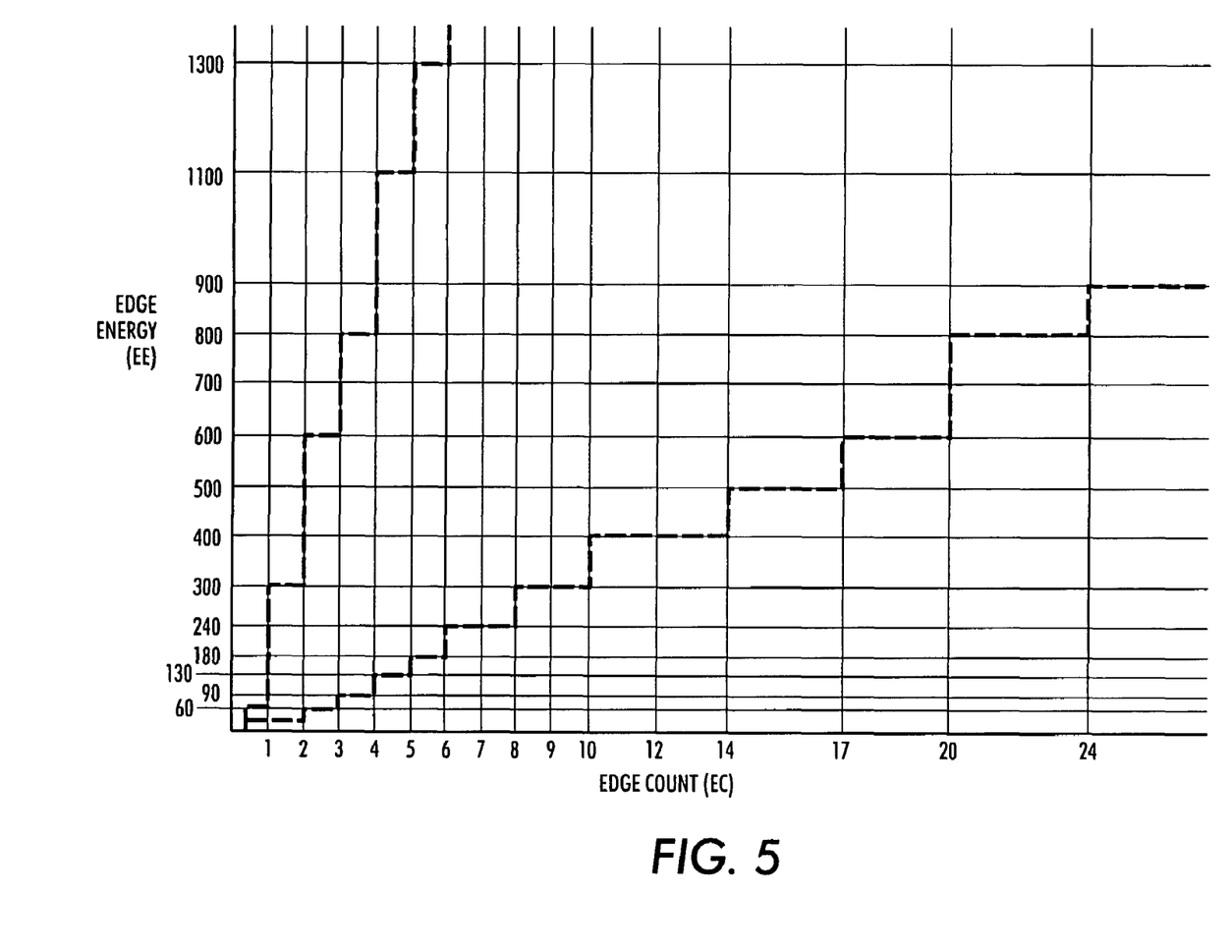
FIG. 5 is a graphical illustration according to a preferred embodiment of the present invention.
Figure 6A:
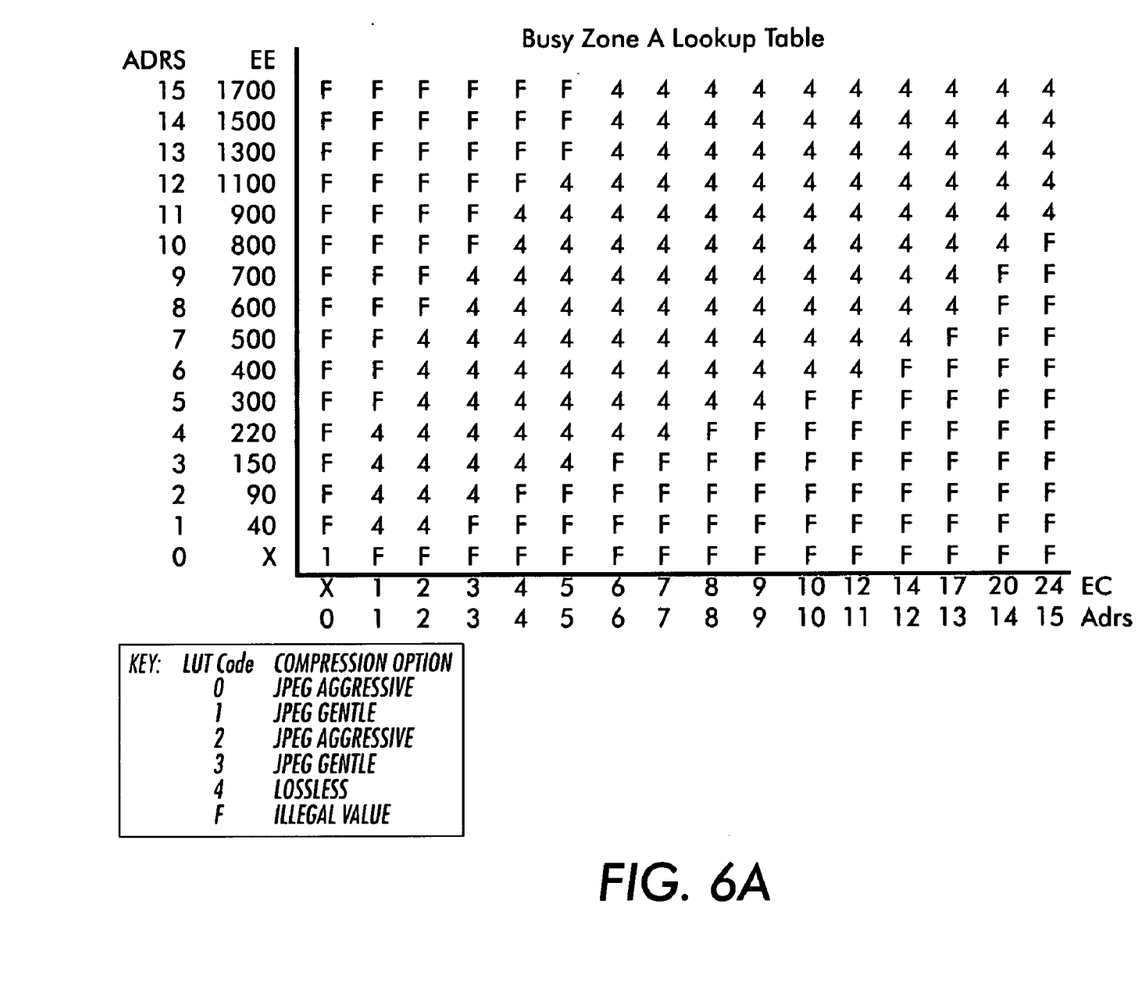
FIGS. 6(a)–(d) are illustrations representing look-up tables used according to a preferred embodiment of the present invention.
Figure 6B:
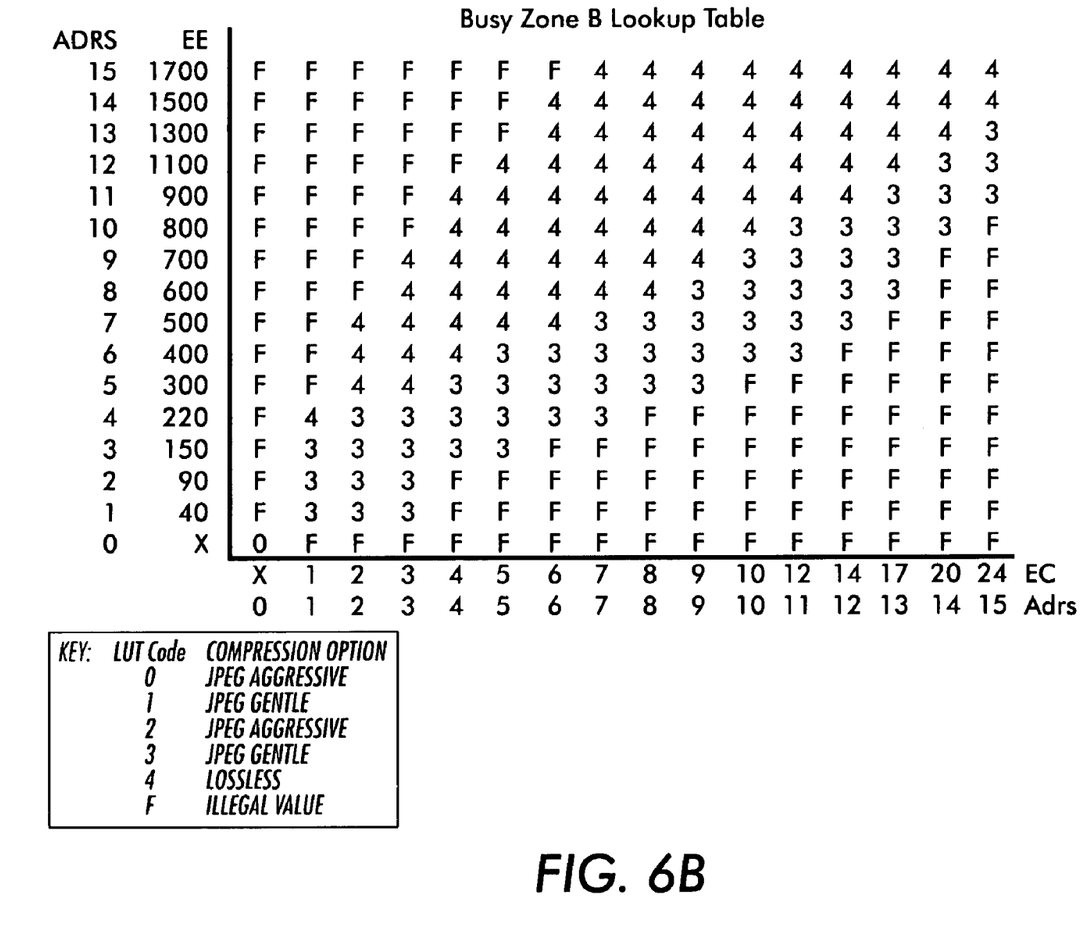
Figure 6C:
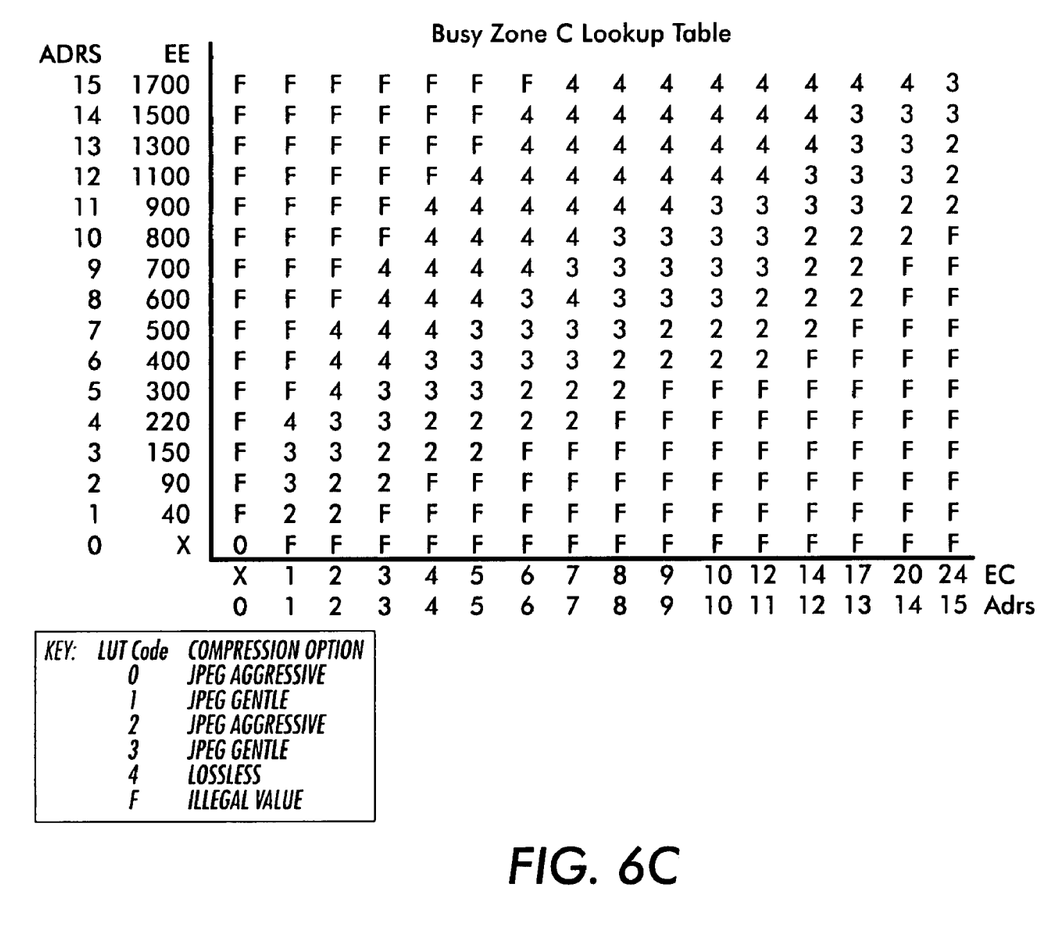
Figure 6D:
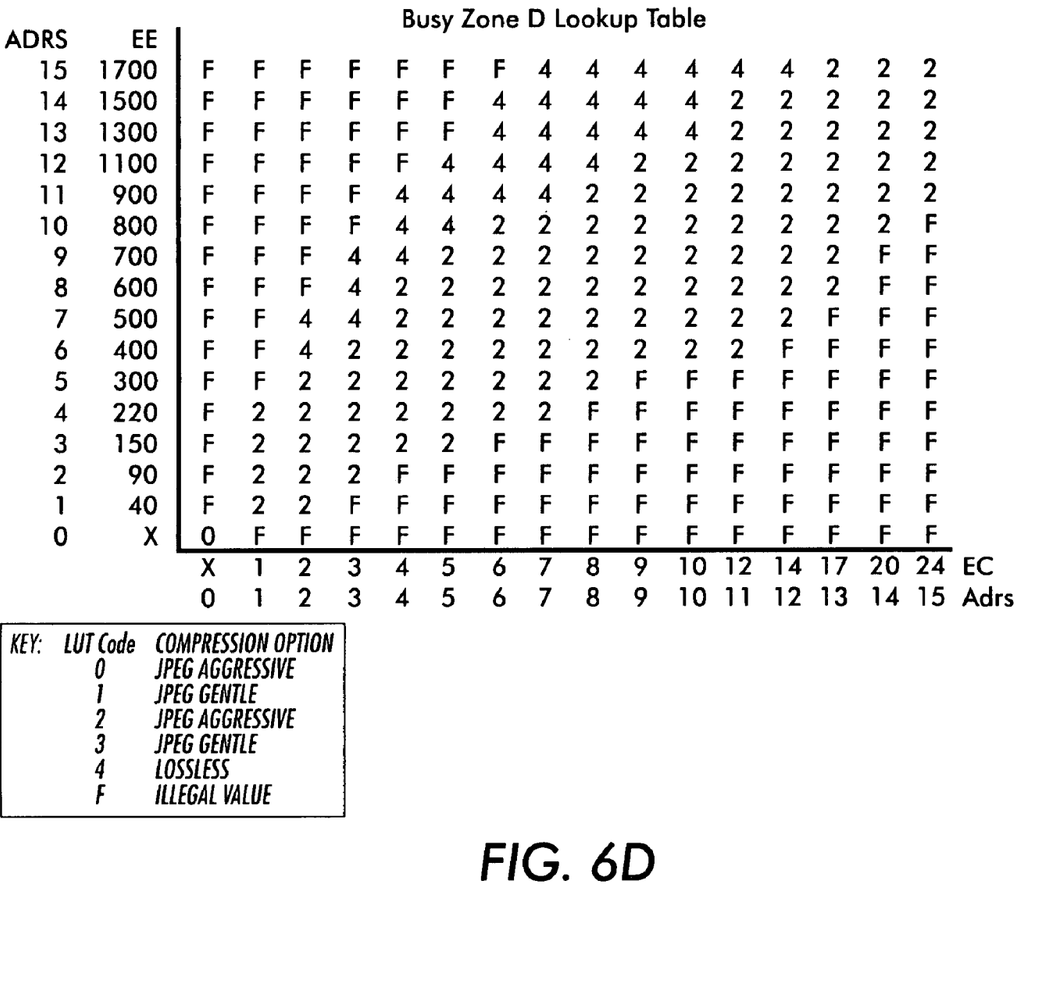

All the procedures presented above are readily amenable to software implementation, but it would not be practical to implement the final selection of the compression option (FIGS. 4(a)–(d)) in hardware without some additional refinement. In software, identifying the region where a block's {EC, EE} coordinate is located can be readily accomplished by mathematically comparing the coordinate to thresholds defined by the equations of the boundary lines. Unless the hardware has computational capability (which might not be cost-effective in many applications), the {EC, EE} coordinate is advantageously located as a cell position in a rectangular grid defined on the EC, EE plane. Such a grid structure allows using a lookup table approach (amenable to both software and hardware) for making compression option decisions. The number of cells in each direction will dictate the lookup table memory requirements. The cell sizes need not be equal. For the described embodiment, a 16×16 cell configuration is preferably established with non-uniform grid line spacing. The grid lines are positioned to provide fine resolution for the smaller values of EC and EE and progressively coarser resolution for larger values of EC and EE. A typical grid structure is shown in FIG. 5.

Figure 7:
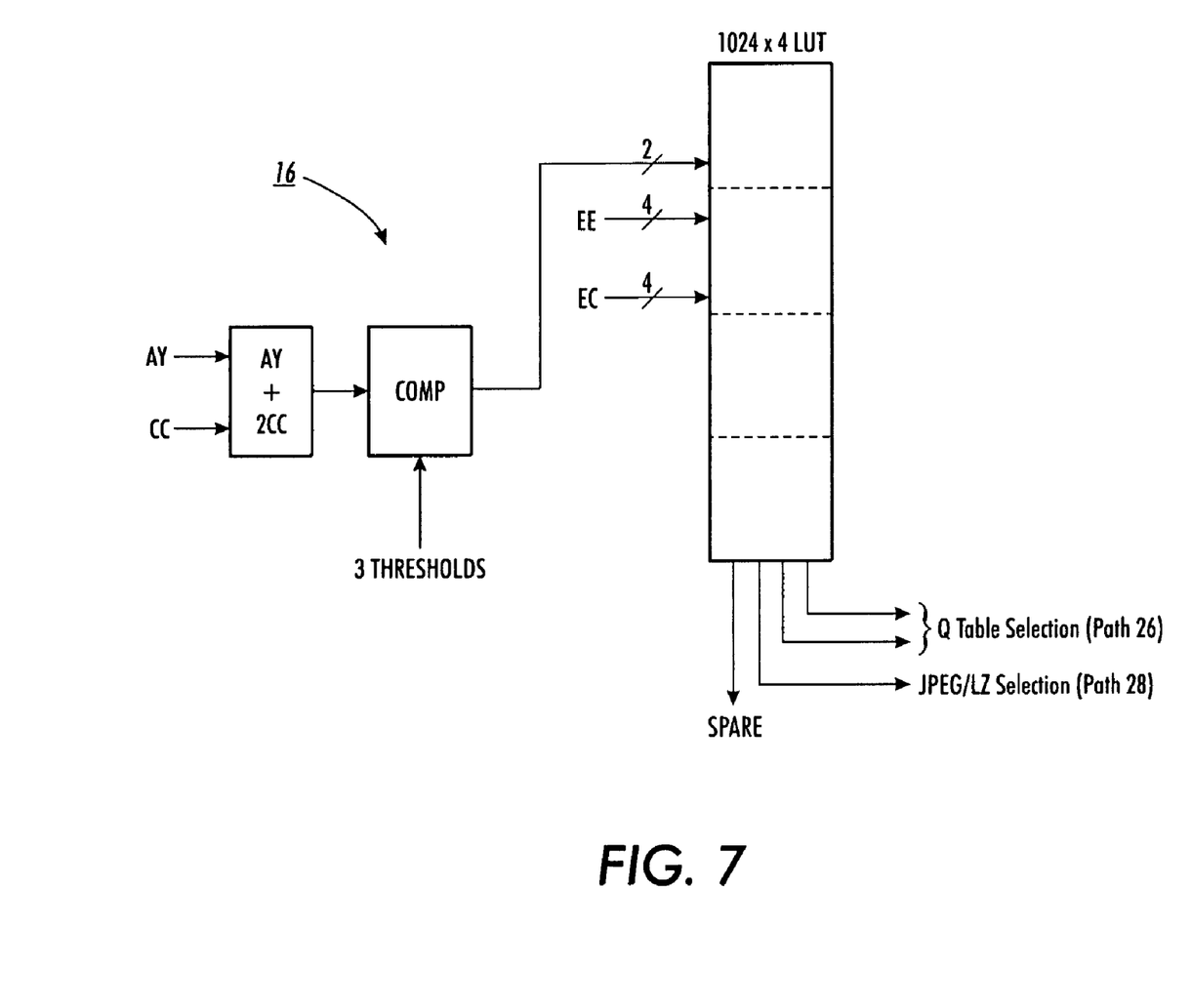
FIG. 7 is a simplified block diagram of a block classifier according to a preferred embodiment of the present invention; and, FIG. 8 is a flowchart illustrating the flow of a preferred embodiment of the present invention.

Referring now to FIGS. 6(a)–(d), these representations depict the proposed compression decision lookup tables for each of the 4 busy zones defined over the AY, CC plane. The numbers shown in each cell represent the following compression option codes for this described embodiment:

Code 0: JPEG Aggressive
Code 1: JPEG Gentle
Code 2: JPEG Aggressive
Code 3: JPEG Gentle
Code 4: Lossless
Code F: Illegal regions Preferred elements of the hardware useful to implement this embodiment are a 1024×4 lookup table memory and associated programmable thresholds for establishing the cell boundaries. In this regard, the configuration of an exemplary block classifier 16 is shown in FIG. 7. Four address bits are needed to select one of 16 cells for the EC coordinate, four more are needed for the 16 EE cells, and 2 bits are needed to define one of the four AY+2CC "busy zones". One of the two primary bits serves to select between Lossless and JPEG as will be output to path 28 (FIG. 1(a)), whereas the second selects between the Gentle and Aggressive Q-tables as will be output to path 26 (FIG. 1(c)).

Extensive analysis and empirical tests done on a set of representative color images led to adopting the parameter values shown in FIGS. 6(a)–(d) and the Q-table values shown in FIGS. 2(a) and (b). These represent one specific set of values from an almost limitless set of possible options. The results obtained for the particular set cited have produced acceptable results.

The above description focuses on a specific, preferred embodiment which uses Lempel-Ziv for the lossless compression option, baseline JPEG (with N=2) for the lossy compression options, 4 specific block characterization metrics (M=4) and a specific decision criteria for mapping each block into one of the three available compression options. Within the context of this invention, there exists a broad latitude for establishing a variety of different decision criteria for mapping each block to a specific compression option.

One specific variation of the disclosed embodiment (which has hardware and compression ratio advantages) consists of diverting Constant Blocks (CC=1) from the normal "block data lossless channel" to the "map data lossless channel" (see FIG. 1). For this implementation, each Constant Block's gray level would be represented by a single byte and merged with map data into a single binary control stream. This stream would then be compressed in it's own lossless channel.

In a broader context, many other embodiments can be formulated using different types of lossless and lossy compression (with arbitrary values of N), different block characterization metrics (with arbitrary values of M) and different decision criteria for mapping each block to a compression option.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. An apparatus for controlling image quality and compression ratios in compressing an image comprised of a plurality of pixel blocks, the apparatus comprising:
   a block analyzer operative to sequentially analyze the blocks to determine values of at least two metrics therefor; and,
   a block classifier, including block mapping assignments in accord with a metric partitioning strategy based on the at least two metrics, the block classifier being operative to determine which of a plurality of compression schemes will be selected to compress each of the blocks based on the determined metric values and the block mapping assignments.

2. The apparatus as set forth in claim 1 wherein at least one of the plurality of compression schemes is a lossy compression scheme.

3. The apparatus as set forth in claim 2 wherein the lossy compression scheme comprises JPEG compression.

4. The apparatus as set forth in claim 3 wherein the JPEG compression comprises at least one of JPEG Aggressive and JPEG Gentle.

5. The apparatus as set forth in claim 1 wherein at least one of the plurality of compression schemes comprises a lossless compression scheme.

6. The apparatus as set forth in claim 5 wherein the lossless compression scheme comprises a Lempel-Ziv compression scheme.

7. The apparatus as set forth in claim 1 further comprising a lossy compression channel and a lossless compression channel, the image blocks being respectively compressed therein.

8. The apparatus as set forth in claim 7 further comprising a system for decompressing compressed data.

9. The apparatus as set forth in claim 1 wherein the block classifier comprises a look-up table.

10. The apparatus as set forth in claim 1, wherein the block classifier is operative to determine which of the plurality of compression schemes will be selected to compress each block by locating the determined metrics within a metric space defined by ranges of possible values of the at least two metrics regions of the metric space being pre-associated with selected ones of the plurality of compression schemes, the locating thereby mapping the determined metrics to a compression scheme.

11. An apparatus for controlling image quality and compression ratios in compressing an image comprised of a plurality of pixel blocks, the apparatus comprising:
   a block analyzer operative to sequentially analyze the blocks to determine at least an activity metric therefor; and,
   a block classifier operative to determine which of a plurality of compression schemes will be selected to compress each of the blocks based on the determined metrics.

12. An apparatus for controlling image quality and compression ratios in compressing an image comprised of a plurality of pixel blocks, the apparatus comprising:
   a block analyzer operative to sequentially analyze the blocks to determine at least a color count metric therefor; and,
   a block classifier operative to determine which of a plurality of compression schemes will be selected to compress each of the blocks based on the determined metrics.

13. An apparatus for controlling image quality and compression ratios in compressing an image comprised of a plurality of pixel blocks, the apparatus comprising:
   a block analyzer operative to sequentially analyze the blocks to determine at least an edge energy metric therefor; and,
   a block classifier operative to determine which of a plurality of compression schemes will be selected to compress each of the blocks based on the determined metrics.

14. An apparatus for controlling image quality and compression ratios in compressing an image comprised of a plurality of pixel blocks, the apparatus comprising:
   a block analyzer operative to sequentially analyze the blocks to determine a plurality of metrics including an edge count metric therefor; and,
   a block classifier operative to determine which of a plurality of compression schemes will be selected to compress each of the blocks based on the determined metrics.

15. A method useful on an image comprising pixel blocks, the method comprising:
   determining block mapping assignments based on at least two metrics and evaluations of test image quality and performance of compression options;
   inputting the image;
   sequentially analyzing the blocks of the image to determine values of the at least two metrics therefor;
   determining a manner in which each block will be compressed based on the block mapping assignments and the determined values of the at least two metrics; and
   compressing each block based on the determining.

16. The method as set forth in claim 15 further comprising decompressing the blocks based on the determining.

17. An apparatus comprising:
   means for receiving an image comprised of blocks;
   means for sequentially analyzing the blocks to determine at least two metrics therefor;
   means for determining a manner in which each block will be compressed based on the at least two metrics; and,
   means for compressing each block based on the determining means.

18. The apparatus as set forth in claim 17 further comprising a means for decompressing the blocks based on the determining means.

* * * * *